Figure 1:
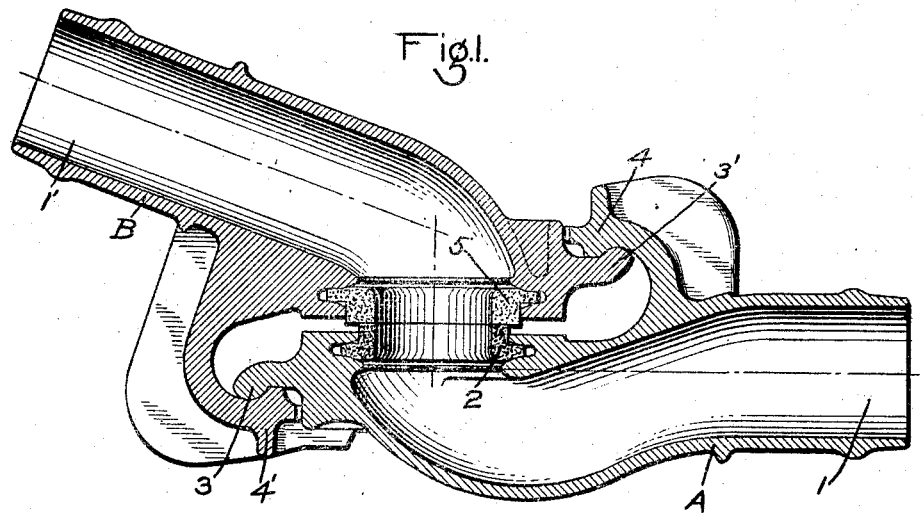

Oct. 27, 1925.

C. C. FARMER

HOSE COUPLING

Filed Feb. 21, 1924

1,558,601

INVENTOR
CLYDE C. FARMER
BY
ATTORNEY

Patented Oct. 27, 1925.

1,558,601

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

HOSE COUPLING.

Application filed February 21, 1924. Serial No. 694,300.

*To all whom it may concern:*

Be it known that I, CLYDE C. FARMER, a citizen of the United States, residing at Pittsburgh, in the county of Allegheny and State of Pennsylvania, have invented new and useful Improvements in Hose Couplings, of which the following is a specification.

This invention relates to hose couplings, and more particularly to the type of hand operated hose couplings, such as are commonly employed to connect up the fluid pressure train lines between cars of a train.

The standard hand operated hose coupling now universally employed to connect fluid pressure train lines between cars of a train comprises a coupling head adapted to be connected to a flexible hose leading to the fluid pressure train line and having means for locking counterpart heads in tight engagement, upon a relative rotative movement of the heads.

The outlet opening of the fluid pressure conduit in the coupling head is provided with a flexible gasket adapted to engage a corresponding flexible gasket of the counterpart coupling head when two couplings are locked together, so as to make a fluid tight joint at the meeting face of the coupling heads.

With the standard hose coupling head as above described, the area of the outlet opening at the gasket is less than the area of the fluid conduit and consequently said outlet opening constitutes a restriction to the flow of fluid through the fluid conduit from one car of a train to another.

The axis of the outlet openings through the gaskets of connected hose couplings is at right angles to the axis of the fluid conduit leading to the openings, and consequently fluid flowing through connected hose couplings suffers two abrupt changes in direction of flow, one in entering and the other in leaving the conduit openings and this sudden changing in direction of flow still further impedes the flow of fluid through the conduit.

Particularly where the train line is employed as a train brake pipe, the above described restriction of and interference to the flow of fluid is detrimental, especially in cases of long trains, since such restriction of flow increases the difficulty of effecting the prompt charging and recharging of the brake pipe and prompt reductions in brake pipe pressure as the length of the train increases.

It is clear that the difficulty can be obviated in part by increasing the area of the outlet opening at the coupling gasket, or in other words, by increasing the inside diameter of the flexible gasket so as to equal or exceed the inside diameter of the fluid conduit, and the flow of fluid may be further facilitated by orienting the gasket, from the position of the standard gasket with its axis at right angles to the axis of the fluid conduit, to a position in which the angle of flow is less abruptly changed in passing through connected coupling heads.

The difficulty in introducing a coupling head provided with a gasket having a larger internal flow area is that it must interchange and be employed with the existing standard coupling head having the gasket with the small internal flow area, or it cannot be used.

But a gasket having the larger internal diameter would obviously not engage with a standard gasket having the smaller internal diameter and one object of my invention is to provide means for overcoming this difficulty so that an improved coupling head may be used with an existing standard coupling head and after the transition period, necessary to effect the substitution of the improved coupling heads for the existing standard coupling heads, the increased flow capacity will be attained.

Another object of my invention is to reduce the extent to which the direction of flow is changed in flowing through connected coupling heads.

In the accompanying drawing; Fig. 1 is a central sectional view of connected coupling heads, illustrating one stage in the method of changing over from the standard coupling head to the improved coupling head; and Fig. 2 a similar view, illustrating the final stage.

In Fig. 1, the reference letter A indicates a coupling head of the existing standard type, having a fluid conduit 1 and a flexible gasket 2 at the meeting face of the coupling head, and having the usual locking flanges 3 and 4, adapted to interlock with similar flanges of a counterpart coupling head.

The reference letter B indicates a coupling head of the proposed type having locking flanges 3' and 4' which correspond with the usual locking flanges 3 and 4 of the standard coupling head.

The recessed opening at the meeting face of the coupling head B is made of such size as to take a flexible gasket having an enlarged internal flow area, but during the transition period, a transition gasket 5 is employed, which will fit the recessed opening in the coupling head, but which is thickened, so that the internal diameter corresponds with the internal diameter of the standard gasket 2, as shown in Fig. 1.

The conduit portion of the coupling head B is so disposed that the angle between the axis of the conduit 1' and the axis through the gasket opening is less abrupt than the angle between the same axis of a standard coupling head.

After the transition period, all the previously existing standard coupling heads will have been removed and all cars will be equipped with the improved coupling head B, but the gaskets therein will be transition gaskets 5.

Figure 2:
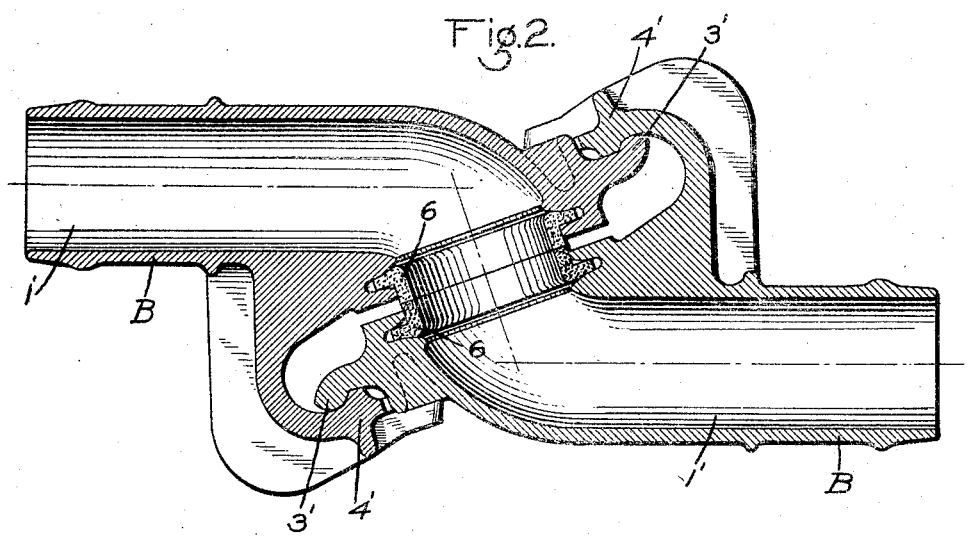

The next stage is to remove the transition gaskets 5 from the improved coupling heads and to substitute the final gaskets 6, as shown in Fig. 2, which gaskets are of ordinary thickness and provides a larger flow area, as will be evident.

It will also be noted that when two improved coupling heads are connected, as shown in Fig. 2, the gaskets are oriented from the position of the gaskets in the previously existing standard coupling heads, so that the change in direction of flow through the connected coupling heads is less abrupt.

When the improved coupling heads have been installed on all cars, and the gaskets having the larger internal diameter have been applied thereto, the flow of fluid through a long train pipe will be greatly facilitated and in the case of a brake pipe, reductions in brake pipe pressure will be effected more promptly than heretofore.

Having now described my invention, what I claim as new and desire to secure by Letters Patent, is:—

1. The method of introducing into service improved hose couplings having gaskets adapted to provide increased flow area, which consists in first equipping the improved hose coupling with a temporary gasket having an internal diameter corresponding with the internal diameter of the existing standard hose coupling gasket and in then substituting for the temporary gasket, a gasket having a greater internal diameter.

2. The method of introducing into service improved hose couplings adapted to receive coupling gaskets having a greater internal diameter and adapted to couple with an existing standard hose coupling, which consists in first applying to the improved hose coupling a temporary gasket having an internal diameter equal to the internal diameter of the existing standard hose coupling gasket and in then substituting for said temporary gasket, a gasket having a greater internal diameter.

3. The method of introducing into service improved hose couplings having gaskets adapted to provide increased flow area and having the axis of the coupling fluid conduit at an angle to the axis of the flow channel at the gasket which is substantially greater than a right angle, which consists in first applying to the improved hose coupling a temporary gasket having an internal diameter corresponding with that of the existing standard hose coupling gasket and in then substituting for the temporary gasket, a gasket having a greater internal diameter.

In testimony whereof I have hereunto set my hand.

CLYDE C. FARMER.